(12) United States Patent
Tseng et al.

(10) Patent No.: US 9,926,966 B2
(45) Date of Patent: Mar. 27, 2018

(54) RESUABLE HANGING DEVICE

(71) Applicants: Cheng-Ta Tseng, New Taipei (TW); Tso-Hua Yeh, New Taipei (TW)

(72) Inventors: Cheng-Ta Tseng, New Taipei (TW); Tso-Hua Yeh, New Taipei (TW)

( * ) Notice: Subject to any disclaimer, the term of this patent is extended or adjusted under 35 U.S.C. 154(b) by 0 days.

(21) Appl. No.: 14/952,990

(22) Filed: Nov. 26, 2015

(65) Prior Publication Data

US 2017/0152988 A1    Jun. 1, 2017

(51) Int. Cl.
*F16B 45/00* (2006.01)
*F16B 47/00* (2006.01)

(52) U.S. Cl.
CPC ............ *F16B 45/00* (2013.01); *F16B 47/003* (2013.01)

(58) Field of Classification Search
CPC ... Y10T 428/24017; F16B 45/00; F16B 47/00
See application file for complete search history.

(56) References Cited

U.S. PATENT DOCUMENTS

2012/0308763 A1* 12/2012 Chen ..................... B32B 3/06
428/78
2015/0192212 A1* 7/2015 Landi, Jr. ............ B29C 49/4252
137/223

FOREIGN PATENT DOCUMENTS

CN    102559112 B    9/2013

OTHER PUBLICATIONS

SGS test report issued by SGS Taiwan Ltd. Mechanical & Hardgoods Laboratory on Oct. 1, 2015.

* cited by examiner

*Primary Examiner* — Alexander Thomas
(74) *Attorney, Agent, or Firm* — Chun-Ming Shih; HDLS IPR Services

(57) ABSTRACT

A reusable hanging device includes: an adhesion layer, a plate layer, and a hook body. Wherein, the adhesion layer is a low stickiness soft plastic made of a thermoplastic elastomer composite material, and it is vacuum-absorbed onto a smooth surface of a wall or a smooth surface of a wall having tiny bumps, by means of the super strong friction force produced on the smooth surface of a wall by the atmospheric pressure. The plate layer is made of hard material, formed integrally on a surface of the adhesion layer. And the hook body is also made of hard material, formed integrally on a surface of the plated layer. In application, the adhesion layer is absorbed onto a smooth surface of a wall by vacuum, the super strong friction force thus produced enables the hook body to hang object of 0~112.6 kgf.

7 Claims, 4 Drawing Sheets

RESUABLE HANGING DEVICE

BACKGROUND OF THE INVENTION

Field of the Invention

The present invention relates to a hanging device, and in particular to a reusable hanging device, that can be hung and attached to a proper position and then detached, and subsequently attached to another position as required for unlimited times; while providing sufficient adhesion force, to be able to hang heavy object.

The Prior Arts

In our daily life, it is often required to use hanging hook to hang clothing, stationery items, key rings, backpacks, and decoration objects, etc. for storage purpose. Usually, the hanging hook is fixed to a predetermined position on a wall. The hanging hook includes fixing elements, such as screws or nails, to fix the hanging hook on the wall. The shortcomings of this type of fixing is that, the presence of screw or nail could adversely affect its outer appearance; while the screw or nail fixed into the wall could create holes, cracks, or even causing damages.

Moreover, a double-side gluing piece can be used to attach and fix a hanging hook onto the wall. Though it is convenient to operate, yet in case it is required to move to another hanging position, it has to be detached from the wall, to cause damage to surface of the wall, or some of the glue may remain on the surface of the wall. Besides, the adhesion force for this type of hanging hook is not sufficient, so that it is not capable of hanging heavy object.

The conventional hanging hook can be made in the following ways: formed by a thin plate; formed not by double-ejection molding or insertion molding; formed by elastomer not capable of supporting heavy load and without adding adhesive; or formed by a structure of which the thickness is insufficient. Therefore, the hanging hook thus produced has the problems that the adhesion force it provides is insufficient, thus it is liable to detach from the wall, and is not capable of hanging heavy objects.

Therefore, presently, the design and performance of hanging device is not quite satisfactory, and it leaves much room for improvement.

SUMMARY OF THE INVENTION

In view of the problems and drawbacks of the prior art, the present invention provides a reusable hanging device, that can be detached and removed to attach onto another position, while providing sufficiently strong adhesion force, thus being able to hang heavy objects, lockers, or par cases.

In order to achieve the objective mentioned above, the present invention provides a reusable hanging device, comprising: an adhesion layer, a plate layer, and a hook body. Wherein, the adhesion layer is a low stickiness soft plastic made of a thermoplastic elastomer composite material, and is provided with a smooth surface having smoothness of at least SP1(A3) (SP1(A3) is Ra 0.02 (surface roughness)). The adhesion layer can be vacuum-absorbed onto a smooth surface of a wall, to use the super strong friction force (slip-resistance force) created by the atmospheric pressure on the smooth surface of the wall. The plate layer is made of hard material, formed integrally on the adhesion layer. The hook body is also made of hard material, formed integrally on the plate layer on a surface facing away from the adhesion layer. As such, the adhesion layer, the plate layer, and the hook body formed integrally together into a reusable hanging device.

Through the structure mentioned above, in application, the adhesion layer is absorbed onto the smooth surface of the wall by means of vacuum, the super strong friction force (slip-resistance force) thus produced enables the hook body to be able to hang heavy object (0~112.6 kgf). Also, the reusable hanging device can be detached, and be reattached onto another smooth surface of a wall as required, without damaging the wall surface and leaving any trace of attaching, in achieving the objective of the present invention.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
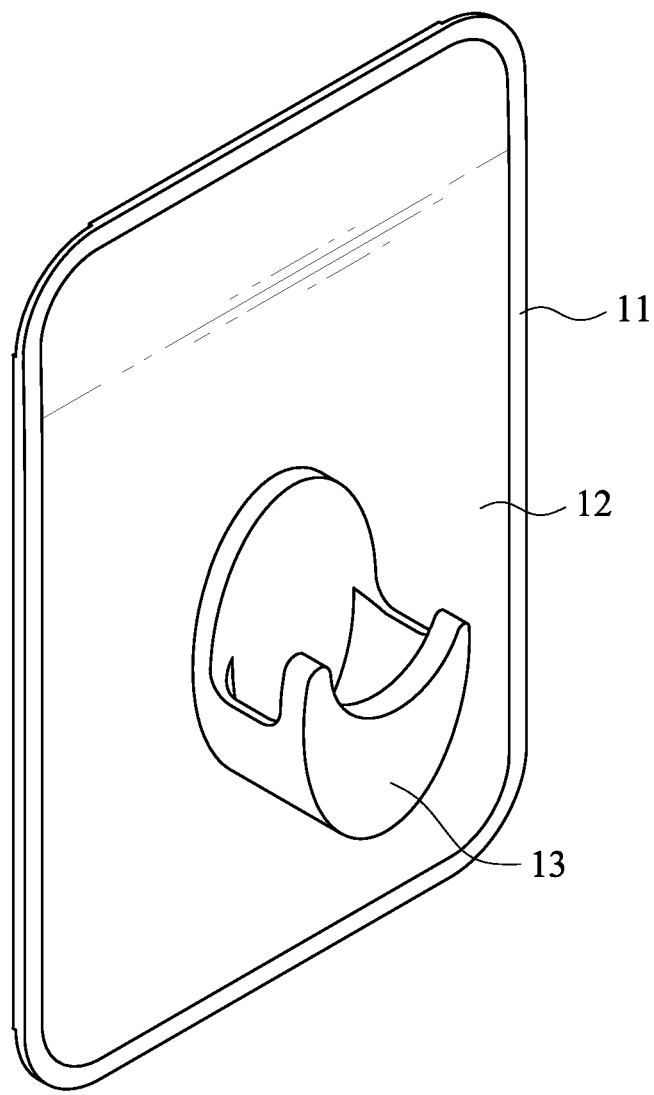
FIG. 1 is a perspective view of a reusable hanging device according to an embodiment of the present invention.
Figure 2:
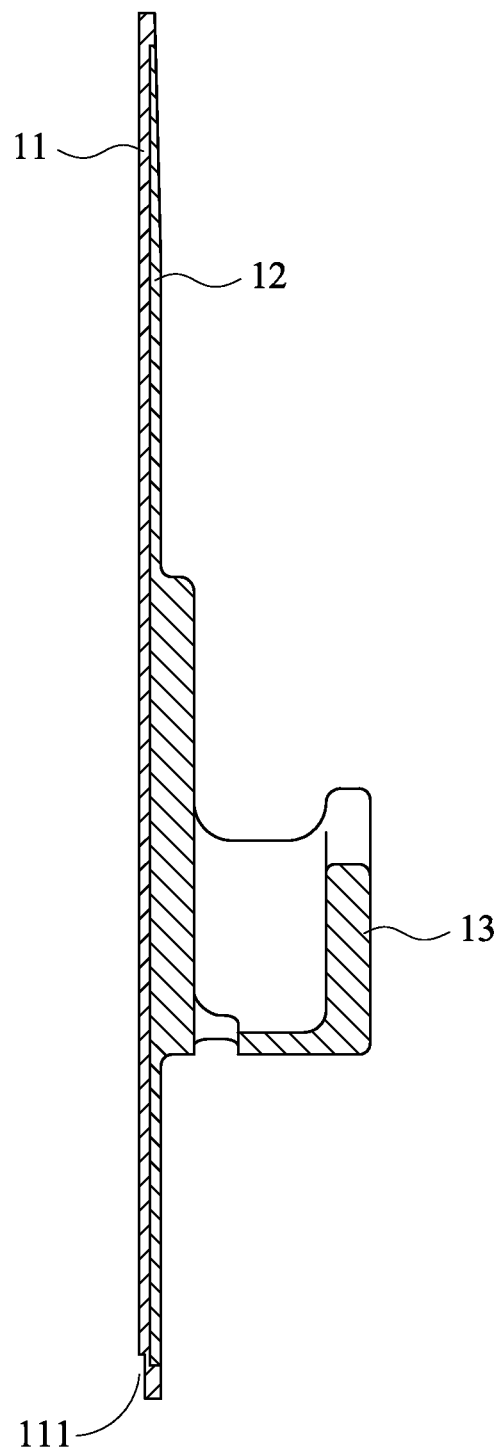
FIG. 2 is a cross section view of a reusable hanging device according to an embodiment of the present invention.
Figure 3:
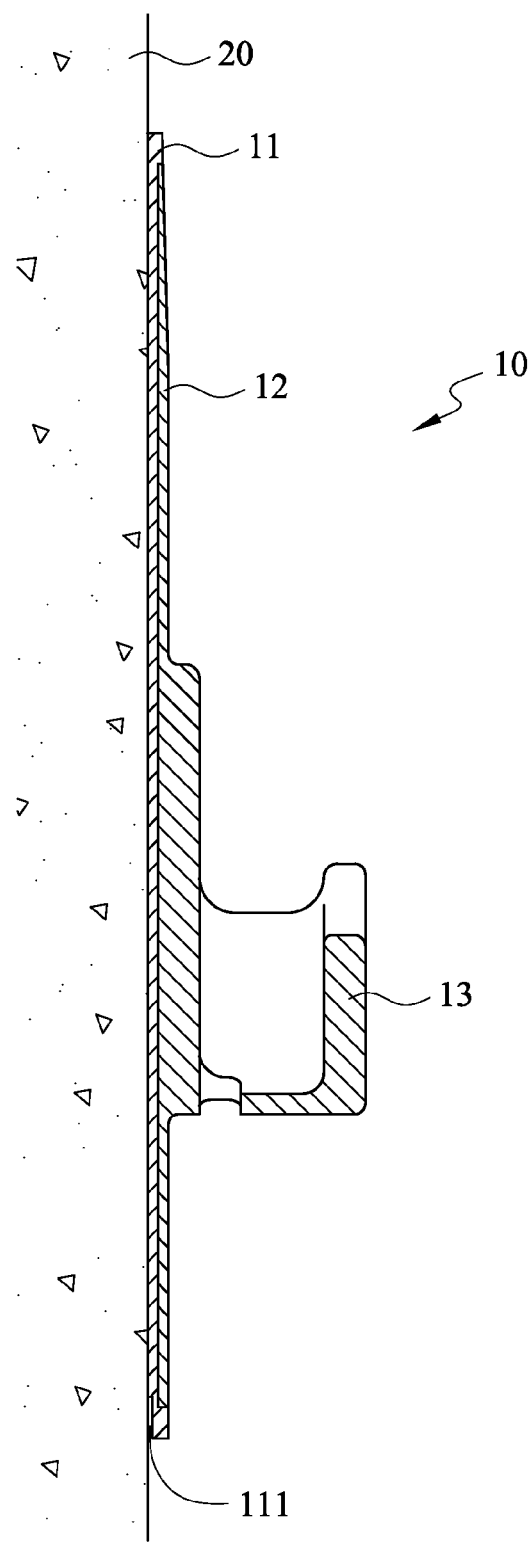
FIG. 3 is a schematic view of a reusable hanging device in usage according to an embodiment of the present invention.

Refer to FIGS. 1, 2, and 3 respectively for a perspective view of a reusable hanging device according to an embodiment of the present invention; a cross section view of a reusable hanging device according to an embodiment of the present invention; and a schematic view of reusable hanging device in usage according to an embodiment of the present invention.

As shown in FIGS. 1, 2, and 3, the reusable hanging device of the present invention mainly includes: an adhesion layer 11, a plate layer 12, and a hook body 13.

Wherein, the adhesion layer 11 is a low stickiness soft plastic made of a thermoplastic elastomer composite material, having the characteristic of rubber superb friction, and is provided with a smooth surface having smoothness of at least SP1(A3) (SP1(A3) is Ra 0.02 (surface roughness)). The adhesion layer can be vacuum-absorbed onto a smooth surface of a wall 20 (for example, surface of a glass wall, tile smooth surface having tiny bumps, smooth surface of iron gate having tiny bumps), to use the super strong friction force (slip-resistance force) created by the atmospheric pressure on the smooth surface of the wall 20.

The plate layer 12 is made of hard material, formed integrally on a surface of the adhesion layer 11.

The hook body 13 is also made of hard material, formed integrally on the surface of the plate layer 12 facing away from the adhesion layer 1. As such, the adhesion layer 11, the plate layer 12, and the hook body 13 formed integrally together into a reusable hanging device 10.

Through the structure mentioned above, in application, the adhesion layer 11 is absorbed onto the smooth surface of the wall 20 by means of vacuum, the super strong friction force (slip-resistance force) produced by the atmospheric pressure (as shown in FIG. 3) enables the hook body 13 to hang heavy object (0~112.6 kgf). Also, the reusable hanging device 10 can be detached, and be reattached onto another smooth surface of a wall 20 as required, without damaging the wall surface or leaving any trace of attaching, in achieving the objective of the present invention.

In this way, the present invention is able to achieve the objective of changing attaching positions without damaging wall surface and leaving traces of attaching, while providing super strong adhesion for hanging heavy object.

Refer again to FIGS. 1 and 3. As shown in FIGS. 1 and 3, the surface of soft plastic for the adhesion layer 11 must be a smooth surface attaining at least SP1(A3) (SP1(A3) is Ra 0.02 (surface roughness)), or at least Ra 50 smoothness. In applying the reusable hanging device 10, it is attached outward by pressing the hook body 13, to squeeze the air out, so that the adhesion layer 11 utilizes atmospheric pressure to produce super strong friction force relative to the smooth surface of the wall 20 having or not having bumps (bump size less than 0.3 mm).

Refer again to FIG. 3, the reusable hanging device 10 is attached to the smooth surface of the wall 20 through the adhesion layer 11 by means of vacuum. The super strong friction force (slip-resistance force) thus produced enables the hook body 13 to be able to hang heavy object. Through SGS pulling force test, the capacity of hanging heavy object can reach as high as 112.6 kgf (as shown in attachment 1). In other words, the reusable hanging device 10 of the present invention is able to hang object of 0~112.6 kgf, and that can not be achieved by the Prior Art. In the Prior Art, the hanging hook can only hang object of 0~30 kgf. In addition, in the present invention, the friction force (slip-resistance force) produced by the atmospheric pressure is utilized, so that when the size of the hook body 13 is enlarged or the number of the reusable hanging device 10 is increased, its object hanging capability may reach as high as several hundred kgfs.

Figure 4:
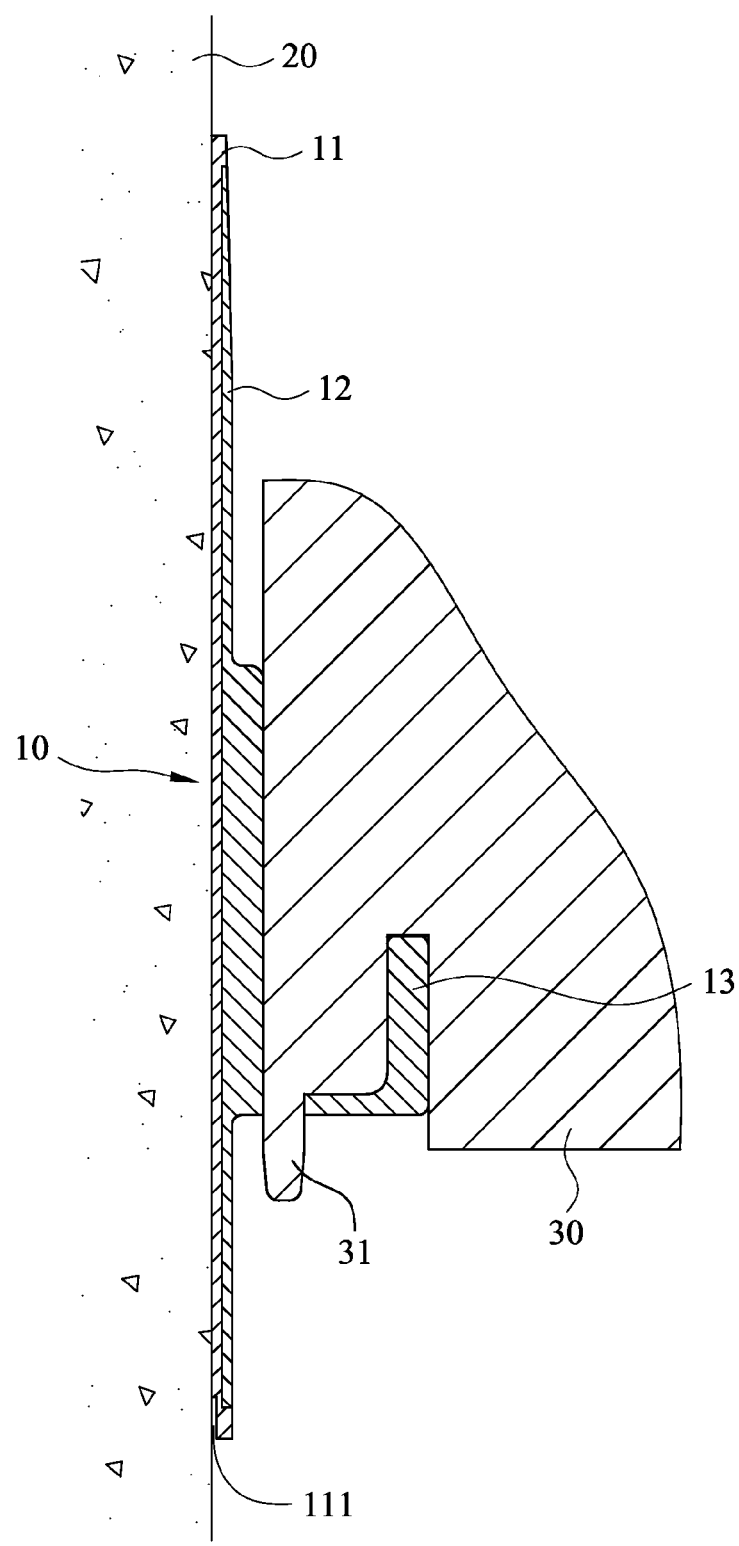
FIG. 4 is a schematic view of a reusable hanging device in usage according to another embodiment of the present invention.

Refer to FIG. 4 for a schematic view of reusable hanging device in usage according to another embodiment of the present invention. As shown in FIG. 4, the hook body 13 can be embedded into a locker 30. A connection head 31 is disposed on the locker 30, to engage the hook body 13, so that the locker 30 can be placed onto the reusable hanging device 10, for placing object therein.

In the following, refer to FIGS. 1, 2, and 3 for detailed descriptions of the reusable hanging device 10. As shown in FIGS. 1, 2, and 3, the adhesion layer 11, the plate layer 12, and the hook body 13 can be formed integrally into a reusable hanging device 10 by means of double-ejection molding, insertion molding, or insertion and extrusion molding, depending on requirement.

As shown in FIGS. 1, 2, and 3, the adhesion layer 11 can be made of soft plastic composite adhesive material of industrial elastomer selected from one of the following group consisting of: TPEE, TPU, TPR, Thermo Plastic Silicone Vulcanizate (TPSiV®), PVC, or Silicon.

As shown in FIGS. 1, 2, and 3, the plate layer 12 can be made of hard material selected from one of the following group consisting of: PC, ABS, PP, PMMA, POM, NYLON, or plastics plus glass fiber.

As shown in FIGS. 1, 2, and 3, the hook body 13 can be made of hard material selected from one of the following group consisting of: PC, ABS, PP, PMMA, POM, NYLON, or plastics plus glass fiber.

As shown in FIGS. 1, 2, and 3, the thickness of soft plastics of the adhesion layer 11 is 0.3~10.0 mm, while the thickness of the plate layer 12 is 0.3~30.0 mm, in achieving raised hanging capacity though increased thickness.

As shown in FIGS. 1, 2, and 3, different thickness of adhesion layer 11 and plated layer 12 are matched in cooperation, to increase absorption capability on the surface of tiny bumps.

As shown in FIGS. 1, 2, and 3, the thickness of the plate layer 12 can be increased 0.3~30.0 mm, or reinforcement rib can be added, or adhesive glue or screw can be added to strengthen the plate layer 12, so as to increase the structure strength of the hook body 13. In addition, the thickness of the soft plastic adhesion layer 11 can be increased, to increase its absorption capability and weight hanging capability beyond that of the hanging hook presently available on the market.

As shown in FIGS. 1, 2, and 3, the hook body 13 is provided with dove tail groove or T-shape groove, for combining with various outside hanging hook, rod, or storage rack or cabin, to provide various hanging functions.

As shown in FIGS. 1, 2, and 3, around the edge of the adhesion layer 11 is provided with an unfilled corner 111, to facilitate the user to extend his finger or hand tool (for example, a flathead screwdriver) into the unfilled corner 111, to remove the adhesion layer 11 from the smooth surface of the wall 20.

As shown in FIGS. 1, 2, and 3, on the plate layer 12 is provided with at least a screw hole, to be used to lock an additional object, such as a multi-function connector head, a storage basket, a support rack, etc.

As shown in FIGS. 1, 2, and 3, around the plate layer 12 is provided with rim having thickness reduced to 0.4 mm, so that the hardness of the rim is reduced, to facilitate attaching the reusable hanging device 10 onto the smooth surface of the wall 20. Also, that makes easier to detach and remove the plate layer 12.

As shown in FIGS. 1, 2, and 3, around the plate layer 12 is wrapped a layer of soft plastic, to prevent water and moisture from seeping into the reusable hanging device 10. Further, it is used to prevent user's hand from being scratched when detaching and removing the plate layer 12.

As shown in FIGS. 1, 2, and 3, the contact between the plate layer 12 and the hook body 13 can be made into an arc surface or a slant surface, to strengthen the load hanging capacity of the reusable hanging device 10. Also, it can prevent the plate layer 12 from being damaged, when detaching and removing the reusable hanging device 10 from the smooth surface of the wall 20.

As shown in FIGS. 1, 2, and 3, tackifier can be added into the thermoplastic elastomer material, to increase the stickiness of the adhesion layer 11, and the weight hanging capacity of the reusable hanging device 10. The tackifier mentioned above can be one of the followings: Rosin ester, Terpene resinite, C5 Hydrocarbon Resin, Coumatone Resin, Aromatic Petroleum Resins, Styrenated, Acrylate Copolymer, other industrial tackifier, and elastomer having stickiness. With regard to the technology of adding tackifier into elastomer material, to increase the weight hanging capacity, refer to Chinese Patent Number CN102559112B.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A reusable hanging device for attaching to a smooth surface of a wall, consisting of:
    an adhesion layer, that is a low stickiness plastic formed by a thermoplastic elastomer composite material provided with a smooth surface having friction force characteristic of rubber, and the smoothness of the smooth surface being at least Ra 0.02, and the adhesive layer being configured to be vacuum-absorbed onto a smooth surface of the wall by means of a friction force created by an atmospheric pressure on a smooth surface of the wall, wherein a side of the adhesion layer is indented;
    a plate layer integrally molded on a surface of the indented side of the adhesion layer to make a surface of the plate layer flush with the adhesion layer; and
    a hook body integrally molded on the surface of the plate layer facing away from the-adhesion layer, so that the adhesion layer, the plate layer, and the hook body are formed integrally,
    wherein, the vacuum-absorbed layer is configured to be vacuum-absorbed onto the smooth surface of the wall, the friction force has the capacity of hanging object up to 112.6 kgf, the reusable hanging device is configured to be attached onto the smooth surface of the wall, and then it is configured to be detached and attached to other smooth surface of the wall as required.

2. The reusable hanging device as claimed in claim 1, wherein the vacuum-absorbed layer is provided with a smooth surface having smoothness of at least Ra 50.

3. The reusable hanging device as claimed in claim 1, wherein the vacuum-absorbed layer, the plate layer, and the hook body are formed by means of double-ejection molding, insertion molding, or insertion and extrusion molding.

4. The reusable hanging device as claimed in claim 1, wherein the plate layer is made of a material of one of the following: PC, ABS, PP, PMMA, POM, and NYLON.

5. The reusable hanging device as claimed in claim 1, wherein the hook body is made of a material of one of the following: PC, ABS, PP, PMMA, POM, and NYLON.

6. The reusable hanging device as claimed in claim 1, wherein on the plate layer is provided with at least a screw hole, to lock and fix an additional object.

7. The reusable hanging device as claimed in claim 1, wherein tackifier is added into the thermoplastic elastomer composite material, to raise the stickiness of the adhesion layer, and weight hanging capacity of the reusable hanging device.

* * * * *

UNITED STATES PATENT AND TRADEMARK OFFICE
CERTIFICATE OF CORRECTION

PATENT NO. : 9,926,966 B2  
APPLICATION NO. : 14/952990  
DATED : March 27, 2018  
INVENTOR(S) : Cheng-Ta Tseng et al.

Page 1 of 1

It is certified that error appears in the above-identified patent and that said Letters Patent is hereby corrected as shown below:

On the Title Page

(54) In the title, "Resuable" should be --Reusable--

Signed and Sealed this
Twenty-fourth Day of September, 2019

Andrei Iancu
*Director of the United States Patent and Trademark Office*